T. A. RAMSAUR.
GLARE SHIELD.
APPLICATION FILED MAR. 17, 1920.
1,390,384.
Patented Sept. 13, 1921.
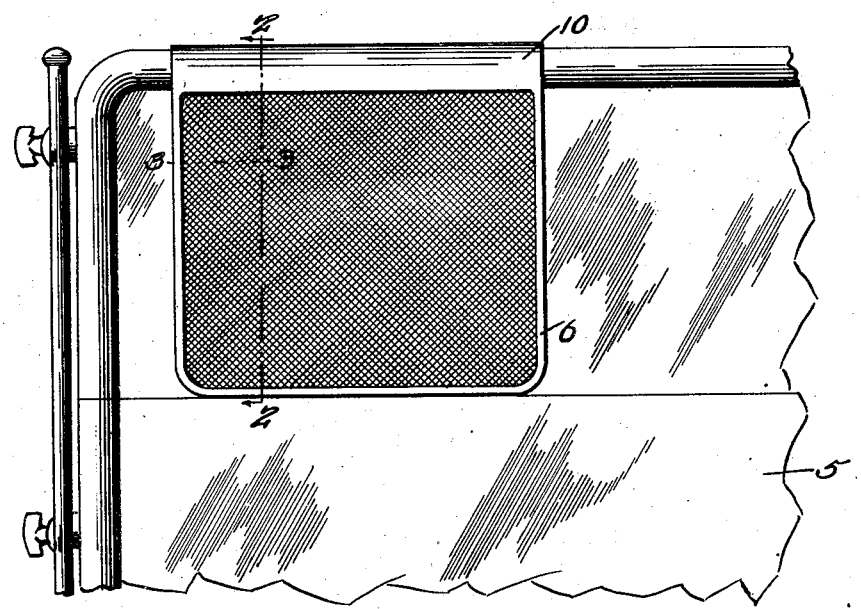
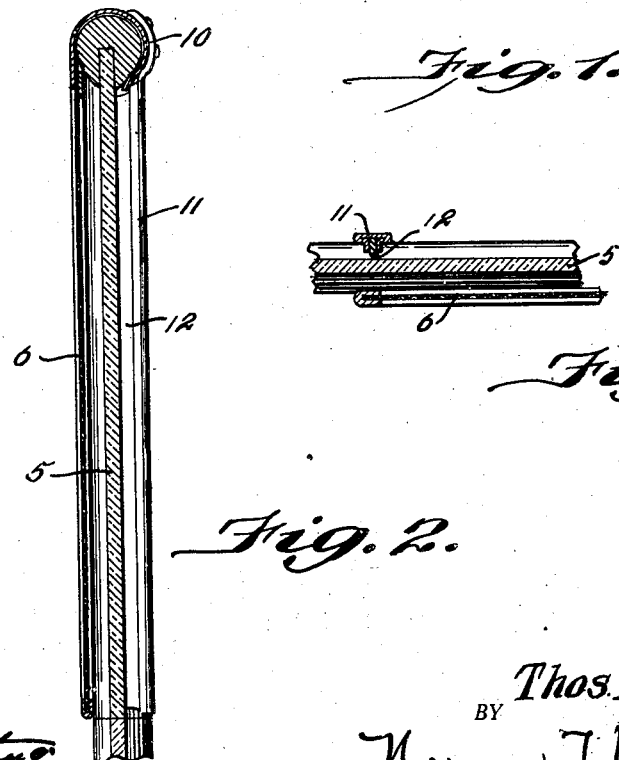
INVENTOR.
Thos. A Ramsaur
BY
Norman T. Whitaker
his ATTORNEY.

UNITED STATES PATENT OFFICE.

THOMAS A. RAMSAUR, OF FAYETTEVILLE, NORTH CAROLINA.

GLARE-SHIELD.

1,390,384.   Specification of Letters Patent.   Patented Sept. 13, 1921.

Application filed March 17, 1920. Serial No. 366,527.

*To all whom it may concern:*

Be it known that I, THOMAS A. RAMSAUR, a citizen of the United States, and a resident of Fayetteville, in the county of Cumberland and State of North Carolina, have invented new and useful Improvements in Glare-Shields, of which the following is a specification.

My invention relates to glare shields for automobiles and other vehicles and has as its primary object the provision of a shield to be supported in the path of vision of the operator to prevent blinding by the lights of a vehicle coming toward him.

A further object of the invention is to provide a glare shield which includes a reticulated sheet such as wire screen to be arranged in the path of vision of the operator of an automobile or the like to enable the operator to see ahead of him and at the same time obviating blinding by vehicle headlights projected in his path.

Still another object of this invention is to provide a glare shield which may be supported on the wind-shield of the automobile and so constructed as to be readily placed in operative position in the path of vision of the operator or can be readily slid to one side of the wind-shield when not in use.

Further the invention embodies a frame provided with resilient clamps for engagement with the wind-shield to support the frame against movement due to the vibration of the vehicle, and a reticulated sheet which obviates glare from the lights projected in the path of the vehicle.

An additional object of the invention is to provide a glare shield of this character which is simple in construction, consists of few parts, and which can be manufactured and sold at a nominal cost.

With the preceding objects and advantages in mind, this invention consists in the novel combination of elements, construction and arrangement of parts, operation and specific features all of which will be hereinafter enlarged upon and reside in the subjoined claim.

On the drawing:

Figure 1 is an elevation of my improved glare-shield in operative position on the wind-shield of an automobile;

Fig. 2 is a vertical sectional view taken on line 2—2 of Fig. 1; and

Fig. 3 is a horizontal fragmentary sectional view taken on line 3—3 of Fig. 1.

Referring to the drawing in detail wherein corresponding characters of reference denote corresponding parts throughout the several views the numeral 5 indicates the usual wind-shield of an automobile upon which the shield is arranged as shown more clearly in Fig. 1.

In reducing the invention to practice I provide a substantially rectangular frame 6 which is channel-shaped in cross section. A sheet of fine mesh wire running at any angle or other reticulated material is stretched across the frame and has its edges disposed in the channel-shaped frame 5 and secured therein by crimping.

Secured or formed integral with the frame 5 at its upper edge is a resilient clamp 10 which extends the entire width of the frame and is shaped to conform to the frame of the wind-shield and resiliently engages the same to retain the device in position on the wind-shield in the path of vision of the operator as illustrated in the drawing.

Secured to the resilient clamp 10 adjacent one end thereof is a channel-shaped bar 11 which extends downwardly and along the outer face of the wind-shield and accommodated in this channel-shaped bar is a wiper or rubber strip 12 which contacts with the wind-shield so that upon the sliding the glare screen back and forth on the wind-shield frame the wind-shield will be cleaned or deposits of moisture wiped therefrom.

From the disclosure it will be apparent that the operator can see through the reticulated screen but that lights projected in his path of vision are shielded or obstructed by the screen. When the device is not in use it can be conveniently arranged to one side of the wind-shield.

It is to be understood that the form of my invention herein shown and described is to be taken as a preferred example of the same, and that various changes in the shape, size and arrangement of parts may be resorted to without departing from the spirit of the invention or the scope of the subjoined claims.

Having thus described my invention, what I claim as new and desire to secure and protect by Letters Patent of the United States is:

The combination with the wind-shield of a vehicle, of a light diffusing sheet extending parallel to the wind-shield and spaced from one face thereof, a resilient clip carried by the upper edge of the sheet and engaging the upper edge of the wind-shield, a bar depending from the clip and extending parallel to the opposite face of the wind-shield, and a yieldable strip carried by the bar and engaging the wind-shield.

THOMAS A. RAMSAUR.